(12) United States Patent
Yoshida et al.

(10) Patent No.: US 9,998,616 B2
(45) Date of Patent: Jun. 12, 2018

(54) IMAGE FORMING APPARATUS, NON-TRANSITORY COMPUTER READABLE RECORDING MEDIUM, AND INFORMATION PROCESSING SYSTEM

(71) Applicant: KYOCERA DOCUMENT SOLUTIONS INC., Osaka (JP)

(72) Inventors: Daisuke Yoshida, Osaka (JP); Ryusuke Nakatani, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days. days.

(21) Appl. No.: 15/478,332

(22) Filed: Apr. 4, 2017

(65) Prior Publication Data

US 2017/0295285 A1    Oct. 12, 2017

(30) Foreign Application Priority Data

Apr. 7, 2016   (JP) ................................. 2016-077193

(51) Int. Cl.
   *H04N 1/00*    (2006.01)

(52) U.S. Cl.
   CPC ....... *H04N 1/0023* (2013.01); *H04N 1/00244* (2013.01); *H04N 1/00411* (2013.01); *H04N 2201/0094* (2013.01)

(58) Field of Classification Search
   CPC ............. H04N 1/0023; H04N 1/00244; H04N 1/00411
   USPC ....................... 358/1.15, 1.13, 1.2
   See application file for complete search history.

(56) References Cited

U.S. PATENT DOCUMENTS

| | | | | |
|---|---|---|---|---|
| 7,990,569 B2* | 8/2011 | Hino | .................. | H04N 1/00347 358/1.15 |
| 8,218,162 B2* | 7/2012 | Kimura | .................. | G06K 15/02 358/1.13 |
| 2010/0002257 A1* | 1/2010 | Isshiki | ............... | H04N 1/40068 358/1.15 |
| 2012/0229833 A1* | 9/2012 | Nakagawa | ........... | H04N 1/0097 358/1.13 |
| 2013/0194633 A1* | 8/2013 | Takatsu | .................. | G06F 3/1211 358/1.15 |
| 2015/0227824 A1* | 8/2015 | Torii | .................. | G06K 15/1823 358/1.2 |
| 2016/0112583 A1* | 4/2016 | Oguma | .............. | H04N 1/00244 358/1.15 |

FOREIGN PATENT DOCUMENTS

| | | |
|---|---|---|
| JP | 2004-086692 A | 3/2004 |
| JP | 2009-194563 A | 8/2009 |

* cited by examiner

*Primary Examiner* — Allen H Nguyen
(74) *Attorney, Agent, or Firm* — Li & Cai Intellectual Property (USA) Office (57) ABSTRACT

An image forming apparatus includes: a pull-print data obtaining circuit that obtains rasterized data depending on a resolution of the image forming apparatus from a server device, the server device storing intermediate data and one or more pieces of rasterized data, the intermediate data being generated based on printable data and independent of a resolution, the one or more pieces of rasterized data being generated based on the intermediate data and depending on one or more resolutions, respectively; and an image forming circuit that forms an image based on the obtained rasterized data.

7 Claims, 10 Drawing Sheets

IMAGE FORMING APPARATUS, NON-TRANSITORY COMPUTER READABLE RECORDING MEDIUM, AND INFORMATION PROCESSING SYSTEM

CROSS REFERENCE TO RELATED APPLICATION

This application claims the benefit of Japanese Priority Patent Application JP2016-077193 filed Apr. 7, 2016, the entire contents of which are incorporated herein by reference.

BACKGROUND OF THE INVENTION

1. Field of the Invention

The present disclosure relates to an image forming apparatus capable of obtaining data from a server device and forming an image, a non-transitory computer readable recording medium that records a program, and an information processing system.

2. Description of Related Art

There is known an image forming apparatus capable of obtaining data from a server device and forming (so-called pull-printing) an image.

It is desirable for an image forming apparatus to obtain data from a server device and to form an image in a shorter time.

SUMMARY OF THE INVENTION

According to an embodiment of the present disclosure, an image forming apparatus includes: a pull-print data obtaining circuit that obtains rasterized data depending on a resolution of the image forming apparatus from a server device, the server device storing intermediate data and one or more pieces of rasterized data, the intermediate data being generated based on printable data and independent of a resolution, the one or more pieces of rasterized data being generated based on the intermediate data and depending on one or more resolutions, respectively; and an image forming circuit that forms an image based on the obtained rasterized data.

According to an embodiment of the present disclosure, a non-transitory computer readable recording medium records a program executable by a computer, the program causing the computer of an image forming apparatus to operate as: a pull-print data obtaining circuit that obtains rasterized data depending on a resolution of the image forming apparatus from a server device, the server device storing intermediate data and one or more pieces of rasterized data, the intermediate data being generated based on printable data and independent of a resolution, the one or more pieces of rasterized data being generated based on the intermediate data and depending on one or more resolutions, respectively; and an image forming circuit that forms an image based on the obtained rasterized data.

According to an embodiment of the present disclosure, an information processing system includes: a server device storing intermediate data and one or more pieces of rasterized data, the intermediate data being generated based on printable data and independent of a resolution, the one or more pieces of rasterized data being generated based on the intermediate data and depending on one or more resolutions, respectively; and an image forming apparatus capable of communicating with the server device, the image forming apparatus including a pull-print data obtaining circuit that obtains rasterized data depending on a resolution of the image forming apparatus from the server device, and an image forming circuit that forms an image based on the obtained rasterized data.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Hereinafter, embodiments of the present disclosure will be described with reference to the drawings.

1. First Embodiment 1-1. Overview of Information Processing System

Figure 1:
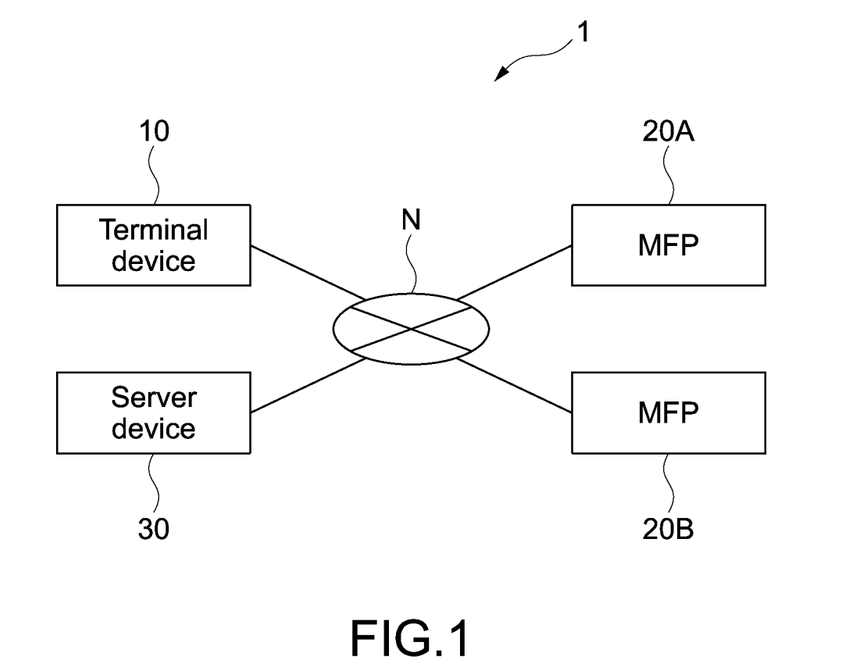
FIG. 1 shows an information processing system according to a first embodiment of the present disclosure.

FIG. 1 shows an information processing system according to a first embodiment of the present disclosure.

The information processing system 1 includes the terminal device 10, the image forming apparatuses (Multifunction Peripherals, hereinafter referred to as MFPs) 20A, 20B . . . , and the server device 30. The MFPs 20A, 20B . . . can communicate with the server device 30 via the network N.

In the description of the present example, the information processing system 1 includes the two MFPs 20A, 20B. The MFPs 20A, 20B may be different models and may have different specs.

The terminal device 10 is an information processing apparatus such as a personal computer. The terminal device 10 can communicate with at least one MFP 20A via the network N or without the network N. In the present example, the terminal device 10 can communicate with the MFPs 20A, 20B via the network N. The terminal device 10 supplies, to the MFP 20A, printable data described in a page description language, which is in conformity with the spec (resolution, etc.) of the MFP 20A. The "printable data" is, for example, printable data used to form an image of a template or the like such as application forms and requisition forms.

One MFP 20A generates intermediate data independent of a resolution based on the printable data obtained from the terminal device 10. The MFP 20A generates rasterized data depending on the resolution of the MFP 20A based on the generated intermediate data. The MFP 20A supplies the generated intermediate data and the generated rasterized data to the server device 30 via the network N, and the server device 30 stores them.

The "intermediate data" independent of a resolution means data immediately before generating rasterized data. The "intermediate data" is obtained by interpreting (analyzing) and converting printable data, and is used only to generate rasterized data. In other words, the resolution of an image to be output is yet to be reflected to the "intermediate data". The "rasterized data" depending on a resolution means bitmap data or the like. The "rasterized data" is obtained by converting intermediate data, and is to be actually output to a printer engine. In other words, the "rasterized data" is in conformity with the resolution of an image to be output from the MFP 20A.

The other MFP 20B can obtain intermediate data or rasterized data stored in the server device 30 via the network N, and forming (pull-printing) an image based on the obtained intermediate data or rasterized data.

Hereinafter, the MFP 20A, which generates intermediate data and rasterized data based on printable data obtained from the terminal device 10, will be referred to as "the first MFP 20A". The MFP 20B, which forms (pull-prints) an image based on data obtained from the server device 30, will be referred to as "the second MFP 20B".

1-2. Hardware Configuration of Image Forming Apparatus

Figure 2:
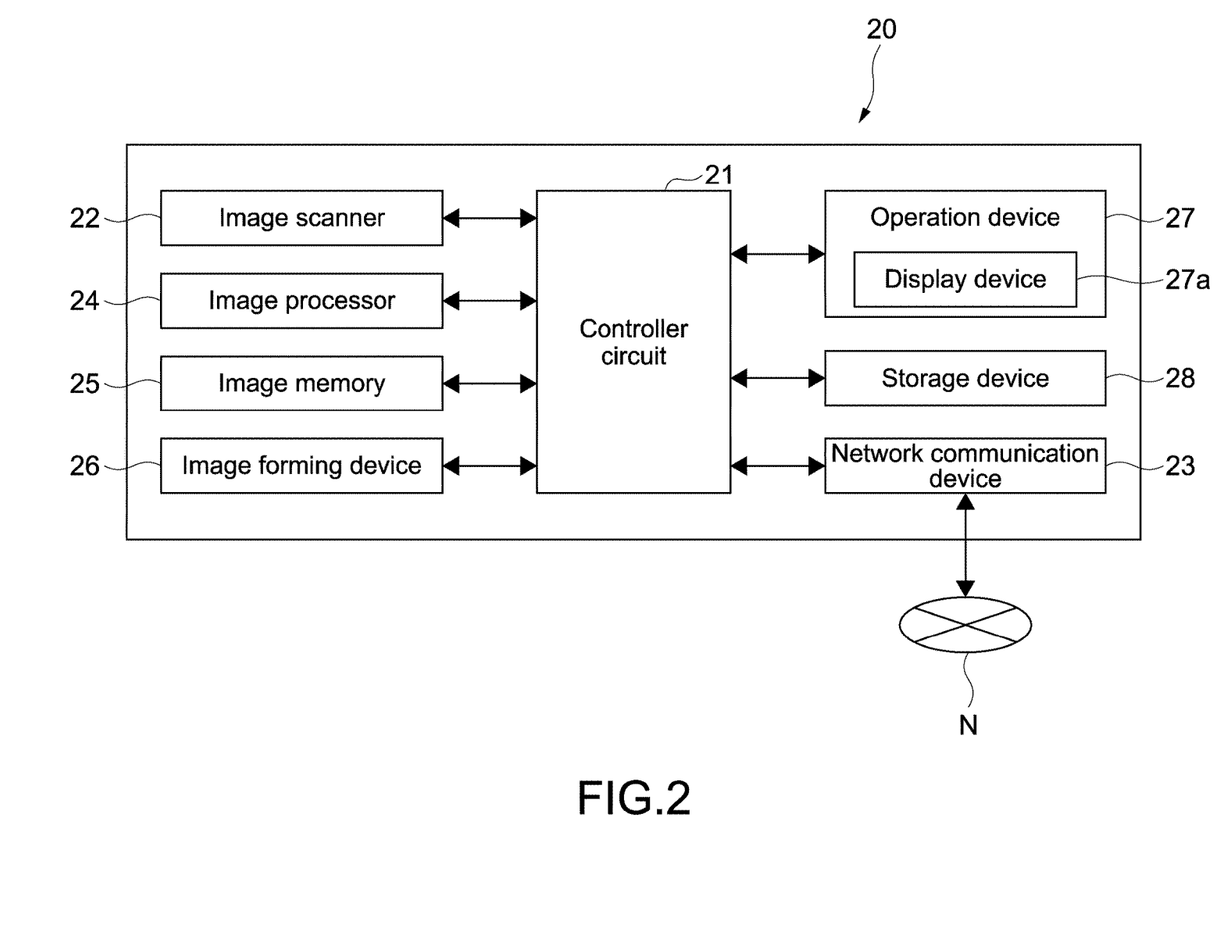
FIG. 2 shows a hardware configuration of an image forming apparatus.

FIG. 2 shows a hardware configuration of an image forming apparatus.

The hardware configuration of the first MFP 20A may be the same as or different from the hardware configuration of the second MFP 20B. Here, a hardware configuration of a typical MFP 20 will be described without distinguishing between the first MFP 20A and the second MFP 20B.

The MFP 20 includes the controller circuit 21. The controller circuit 21 includes a CPU (Central Processing Unit), a RAM (Random Access Memory), a ROM (Read Only Memory), dedicated hardware circuits, and the like, and controls the entire operations of the MFP 20. Computer programs causing the MFP 20 to operate as the respective functional units (described later) are stored in a non-transitory computer readable recording medium such as a ROM.

The controller circuit 21 is connected to the image scanner 22, the image processor 24, the image memory 25, the image forming device 26, the operation device 27, the storage device 28, the network communication device 23, and the like. The controller circuit 21 controls operations of the above-mentioned devices connected thereto, and sends/receives signals/data to/from the devices.

The controller circuit 21 receives instructions to execute jobs input from the operation device 27 or from a personal computer (not shown) connected to the network N by a user. In response to the instructions, the controller circuit 21 controls to drive and process the mechanisms necessary to control operations of functions such as scanner functions, printing functions, and copying functions.

The image scanner 22 captures an image from a script.

The image processor 24 processes image data of the image captured by the image scanner 22 as necessary. For example, the image processor 24 processes the image (e.g., corrects shading of the image) captured by the image scanner 22 in order to improve the quality of an image to be formed.

The image memory 25 has an area for temporarily storing data of the image of the script captured by the image scanner 22, and an area for temporarily storing data to be printed by the image forming device 26.

The image forming device 26 (image forming circuit) forms an image of, for example, the image data captured by the image scanner 22.

The operation device 27 includes a touch panel device and operation key devices that accept instructions input by a user about various operations and processes that the MFP 20 can execute. The touch panel device includes the display device 27a such as a LCD (Liquid Crystal Display) including a touch panel.

The network communication device 23 is an interface to be connected to the network N.

The storage device 28 is a large-volume storage device such as a HDD (Hard Disk Drive) that stores, for example, the script image captured by the image scanner 22.

1-3. Hardware Configuration of Terminal Device

The terminal device 10 is a typical information processing apparatus such as a personal computer. The hardware configuration thereof will not be shown. The CPU (Central Processing Unit) of the terminal device 10 loads programs stored in the ROM (Read Only Memory) into the RAM (Random Access Memory) and executes the programs. The terminal device 10 supplies printable data described in a page description language to the first MFP 20A via the network N.

1-4. Hardware Configuration of Server Device

The server device 30 is a typical information processing apparatus such as a personal computer. The server device 30 may include large-volume storage devices (HDD (Hard Disk Drive), SSD (Solid State Drive), etc.). The hardware configuration thereof will not be shown. The CPU of the server device 30 loads programs stored in the ROM into the RAM and executes the programs. The server device 30 stores intermediate data, rasterized data, and the like in the storage device. In response to a request from the second MFP 20B, the server device 30 supplies intermediate data or rasterized data to the second MFP 20B via the network N.

1-5. Functional Configuration of Image Forming Apparatus

Figure 3:
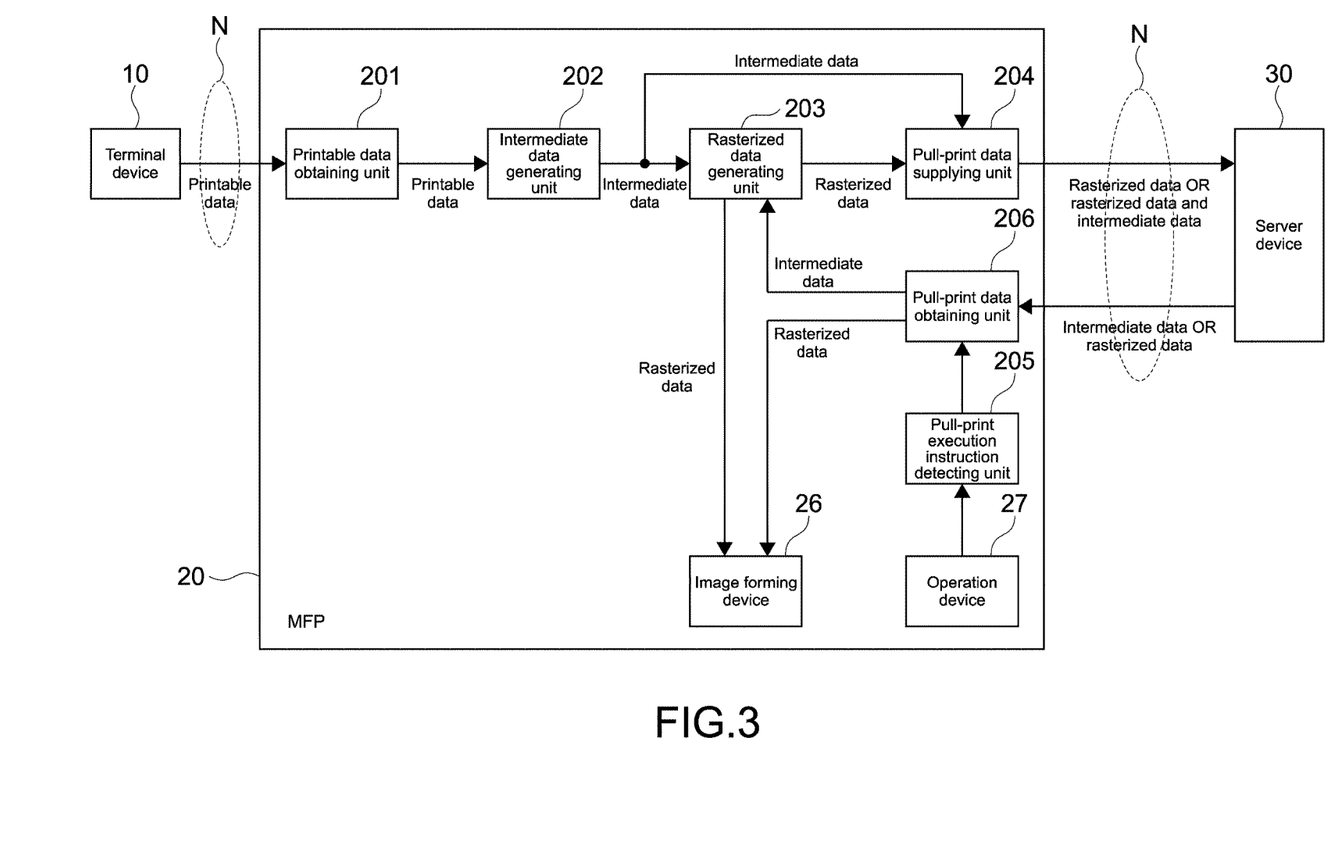
FIG. 3 shows a functional configuration of the image forming apparatus.

FIG. 3 shows a functional configuration of the image forming apparatus.

The functional configuration of the first MFP 20A may be the same as or different from the functional configuration of the second MFP 20B. Here, a functional configuration of the MFP 20 will be described without distinguishing between the first MFP 20A and the second MFP 20B.

The MFP 20 operates as, by executing an information processing program, the printable data obtaining unit 201 (printable data obtaining circuit), the intermediate data generating unit 202 (intermediate data generating circuit), the rasterized data generating unit 203 (rasterized data generating circuit), the pull-print data supplying unit 204 (pull-print data supplying circuit), the pull-print execution instruction detecting unit 205 (pull-print execution instruction detecting circuit), and the pull-print data obtaining unit 206 (pull-print data obtaining circuit).

The printable data obtaining unit 201 obtains printable data in conformity with the resolution of the MFP 20 from the terminal device 10 via the network N.

The intermediate data generating unit 202 interprets the printable data, and generates intermediate data independent of a resolution.

The rasterized data generating unit 203 generates rasterized data depending on the resolution of the MFP 20 based on the intermediate data.

The pull-print data supplying unit 204 supplies the intermediate data, the rasterized data depending on the resolution of the MFP 20, and the resolution information of the MFP 20 in relation with each other to the server device 30 via the network N. Alternatively, the pull-print data supplying unit 204 supplies the rasterized data depending on the resolution of the MFP 20 and the resolution information of the MFP 20 in relation with each other to the server device 30 via the network N.

The pull-print execution instruction detecting unit 205 detects a particular operation input in the operation device 27 by a user as a pull-print execution instruction for pull-printing a particular content.

The pull-print data obtaining unit 206 obtains rasterized data of a particular content depending on the resolution of the MFP 20 from the server device 30 via the network N, where the resolution information of the rasterized data stored in the server device 30 is the same as the resolution information of the MFP 20. The pull-print data obtaining unit 206 obtains intermediate data of a particular content from the server device 30 via the network N, where the resolution information of the rasterized data stored in the server device 30 is not the same as the resolution information of the MFP 20.

The image forming device 26 forms an image based on the rasterized data generated by the rasterized data generating unit 203 or based on the rasterized data obtained by the pull-print data obtaining unit 206 from the server device 30.

1-6. Operation of Information Processing System

Figure 4:
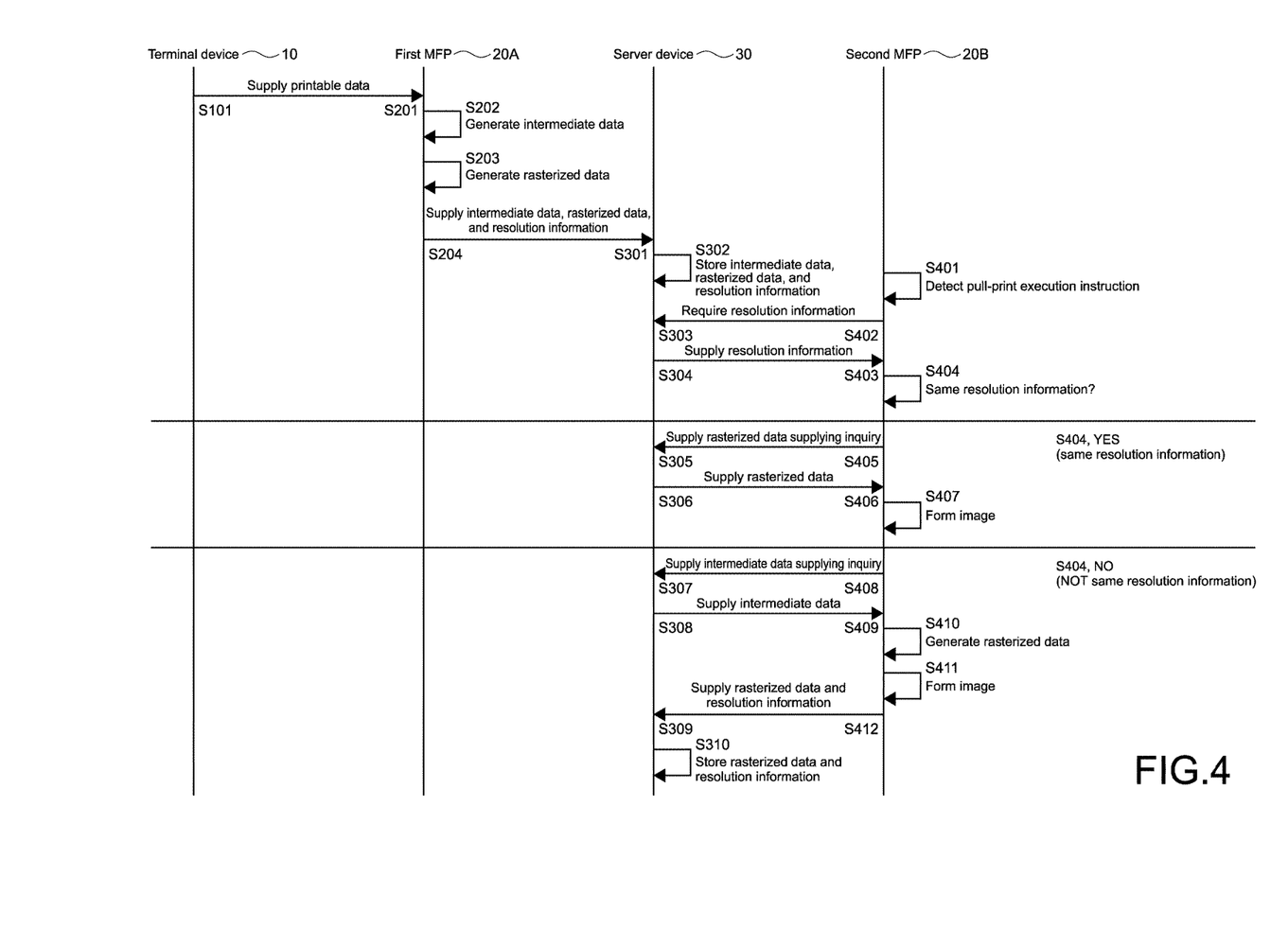
FIG. 4 shows an operational sequence of the information processing system.
Figure 5:
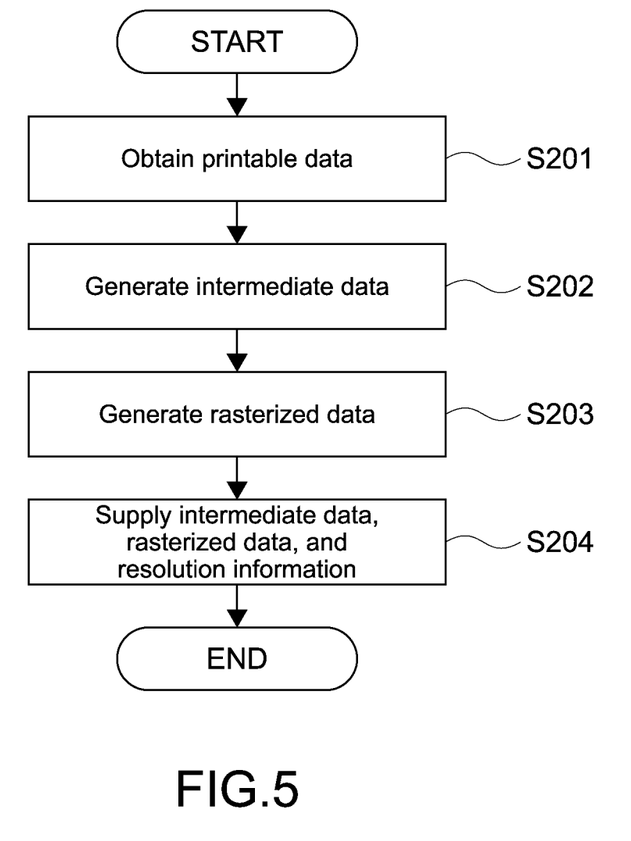
FIG. 5 shows an operational flow of the first image forming apparatus.
Figure 6:
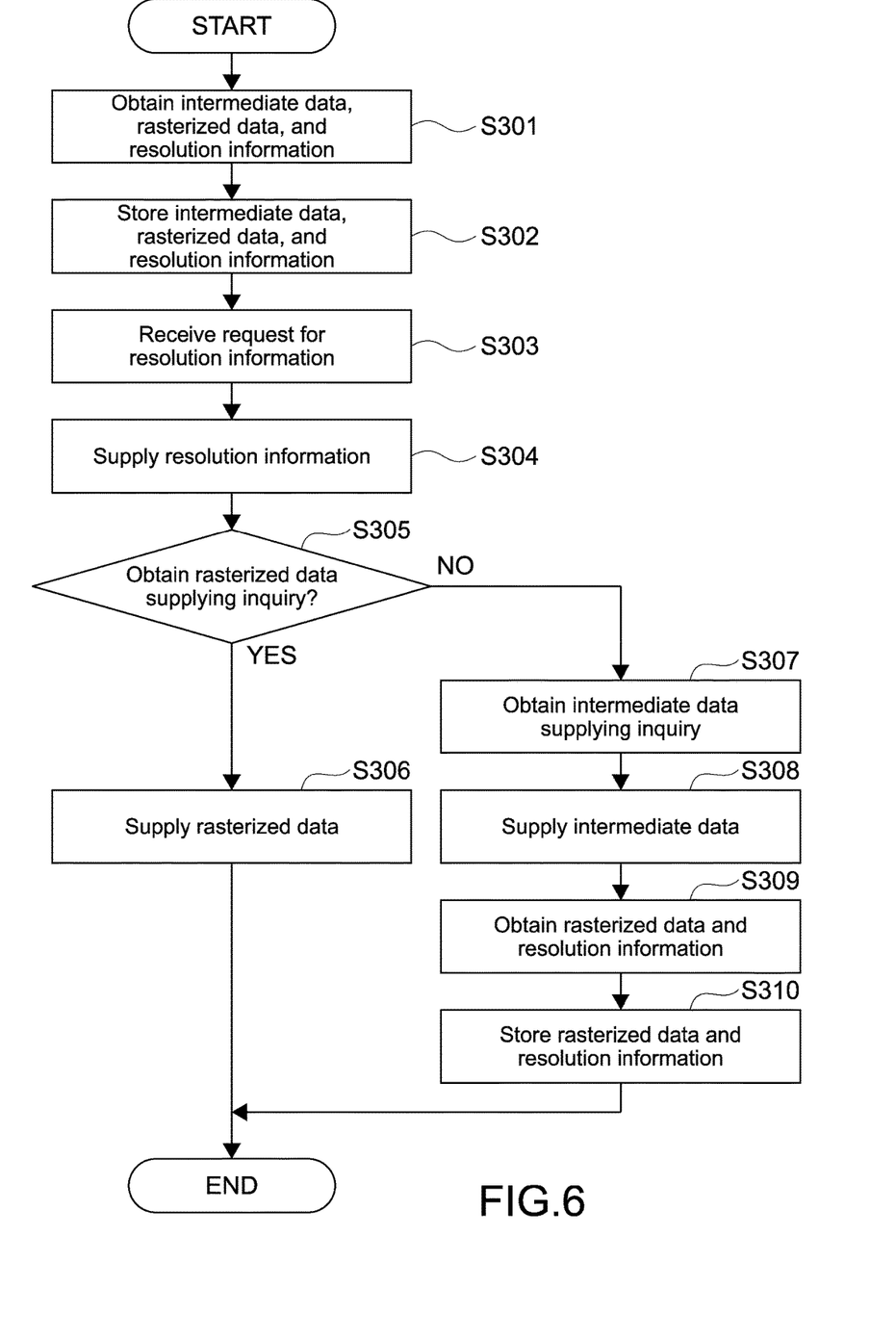
FIG. 6 shows an operational flow of the server device.
Figure 7:
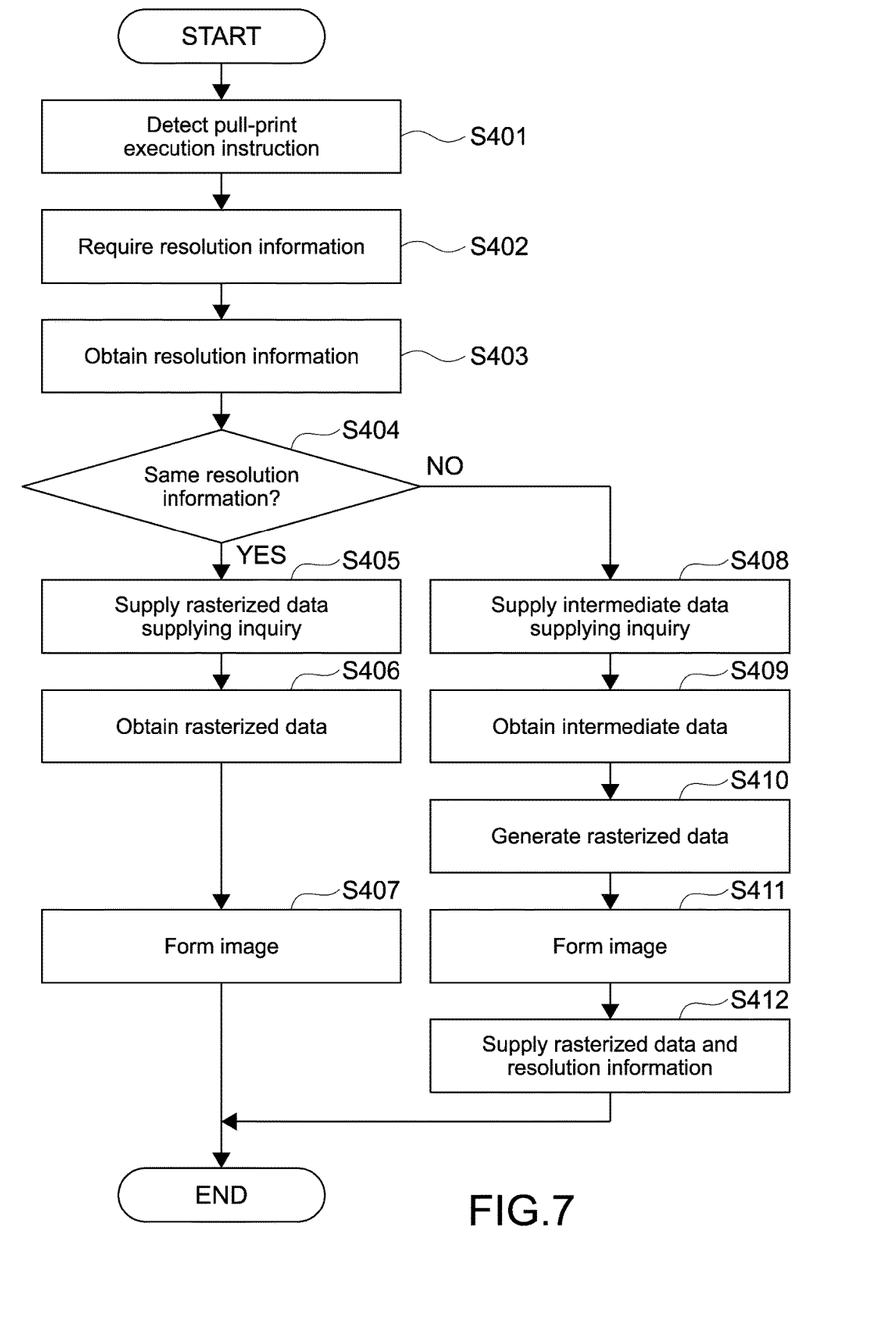
FIG. 7 shows an operational flow of the second image forming apparatus.

FIG. 4 shows an operational sequence of the information processing system. FIG. 5 shows an operational flow of the first image forming apparatus. FIG. 6 shows an operational flow of the server device. FIG. 7 shows an operational flow of the second image forming apparatus.

In response to a particular operation input by a user, the terminal device 10 supplies printable data, which is described in a page description language and is in conformity with the resolution of the first MFP 20A, to the first MFP 20A via the network N (Step S101).

The printable data obtaining unit 201 of the first MFP 20A obtains the printable data, which is in conformity with the resolution of the first MFP 20A, from the terminal device 10 via the network N (Step S201). In the present example, the resolution of the first MFP 20A is 1200 dpi (dots per inch). The printable data obtaining unit 201 supplies the printable data obtained from the terminal device 10 to the intermediate data generating unit 202.

The intermediate data generating unit 202 of the first MFP 20A obtains the printable data from the printable data obtaining unit 201, and then interprets the obtained printable data and generates intermediate data independent of a resolution (Step S202). The intermediate data generating unit 202 supplies the generated intermediate data to the rasterized data generating unit 203 and to the pull-print data supplying unit 204.

The rasterized data generating unit 203 of the first MFP 20A obtains the intermediate data from the intermediate data generating unit 202, and then generates rasterized data depending on the resolution (1200 dpi) of the first MFP 20A based on the obtained intermediate data (Step S203). The rasterized data generating unit 203 supplies the generated rasterized data to the pull-print data supplying unit 204.

The pull-print data supplying unit 204 of the first MFP 20A obtains the intermediate data from the intermediate data generating unit 202, and obtains the rasterized data depending on the resolution (1200 dpi) of the first MFP 20A from the rasterized data generating unit 203. The pull-print data supplying unit 204 supplies the intermediate data, the rasterized data depending on the resolution (1200 dpi) of the first MFP 20A, and the resolution information (1200 dpi) of the first MFP 20A in relation with each other, to the server device 30 via the network N (Step S204).

The server device 30 obtains the intermediate data, the rasterized data depending on the resolution (1200 dpi) of the first MFP 20A, and the resolution information (1200 dpi) of the first MFP 20A, from the first MFP 20A via the network N (Step S301). The server device 30 stores the obtained intermediate data, the obtained rasterized data depending on the resolution (1200 dpi), and the obtained resolution information (1200 dpi) in relation with each other (Step S302).

Meanwhile, the pull-print execution instruction detecting unit 205 of the second MFP 20B detects a particular operation input in the operation device 27 by a user, as a pull-print execution instruction for pull-printing a particular content (Step S401). The pull-print execution instruction detecting unit 205 notifies the pull-print data obtaining unit 206 that the pull-print execution instruction is detected.

The pull-print data obtaining unit 206 of the second MFP 20B receives a notification of the pull-print execution instruction, and then requires the resolution information of the rasterized data of the particular content, which is stored in the server device 30, of the server device 30 via the network N (Step S402).

The server device 30 receives the request from the second MFP 20B via the network N (Step S303). The server device 30 supplies the resolution information of the rasterized data of the particular content, which is stored in the server device 30, to the second MFP 20B via the network N (Step S304).

In the present example, the server device 30 obtains (Step S301) the rasterized data depending on the resolution (1200 dpi) from the first MFP 20A, and stores (Step S302) the rasterized data. Therefore the server device 30 supplies the resolution information (1200 dpi) of the rasterized data, which is stored in the server device 30, to the second MFP 20B via the network N (Step S304).

The pull-print data obtaining unit 206 of the second MFP 20B obtains the resolution information of the rasterized data, which is stored in the server device 30, from the server device 30 via the network N (Step S403). The pull-print data obtaining unit 206 determines if the resolution information of the rasterized data stored in the server device 30 is the same as the resolution information of the second MFP 20B or not (Step S404).

For example, where the resolution of the second MFP 20B is 1200 dpi, the pull-print data obtaining unit 206 determines that the resolution information (1200 dpi) of the rasterized data stored in the server device 30 is the same as the resolution information (1200 dpi) of the second MFP 20B (Step S404, YES). On the other hand, for example, where the resolution of the second MFP 20B is 600 dpi, the pull-print data obtaining unit 206 determines that the resolution information (1200 dpi) of the rasterized data stored in the server device 30 is NOT the same as the resolution information (600 dpi) of the second MFP 20B (Step S404, NO). Hereinafter, the operation where the resolution information is the same (Step S404, YES) and the operation where the resolution information is NOT the same (Step S404, NO) will be described separately.

1-6-1. Operation of Information Processing System where Resolution Information is the Same First, the pull-print data obtaining unit 206 of the second MFP 20B determines that the resolution information (1200 dpi) of the rasterized data stored in the server device 30 is the same as the resolution information (1200 dpi) of the second MFP 20B (Step S404, YES). In this case, the pull-print data obtaining unit 206 supplies a rasterized data supplying inquiry for supplying the rasterized data of the particular content depending on the resolution of the second MFP 20B, to the server device 30 via the network N (Step S405).

The server device 30 obtains the rasterized data supplying inquiry from the second MFP 20B via the network N (Step S305, YES). The server device 30 supplies the rasterized data of the particular content depending on the resolution of the second MFP 20B, which is stored in the server device 30, to the second MFP 20B via the network N (Step S306).

The pull-print data obtaining unit 206 of the second MFP 20B obtains the rasterized data of the particular content depending on the resolution of the second MFP 20B from the server device 30 via the network N (Step S406). The pull-print data obtaining unit 206 supplies the obtained rasterized data to the image forming device 26.

The image forming device 26 of the second MFP 20B obtains the rasterized data from the pull-print data obtaining unit 206, and forms an image based on the obtained rasterized data (Step S407).

1-6-2. Operation of Information Processing System where the Resolution Information is NOT the Same On the other hand, the pull-print data obtaining unit 206 of the second MFP 20B determines that the resolution information (1200 dpi) of the rasterized data stored in the server device 30 is NOT the same as the resolution information (for example, 600 dpi) of the second MFP 20B (Step S404, NO). In this case, the pull-print data obtaining unit 206 supplies an intermediate data supplying inquiry for supplying the intermediate data of the particular content, to the server device 30 via the network N (Step S408).

The server device 30 obtains the intermediate data supplying inquiry from the second MFP 20B via the network N (Step 305, NO, and Step S307). The server device 30 supplies the intermediate data of the particular content, which is stored in the server device 30, to the second MFP 20B via the network N (Step S308).

The pull-print data obtaining unit 206 of the second MFP 20B obtains the intermediate data of the particular content from the server device 30 via the network N (Step S409). The pull-print data obtaining unit 206 supplies the obtained intermediate data of the particular content to the rasterized data generating unit 203.

The rasterized data generating unit 203 of the second MFP 20B generates rasterized data depending on the resolution (600 dpi) of the second MFP 20B based on the intermediate data of the particular content obtained from the pull-print data obtaining unit 206 (Step S410). The rasterized data generating unit 203 supplies the generated rasterized data to the pull-print data supplying unit 204 and the image forming device 26.

The image forming device 26 of the second MFP 20B obtains the rasterized data from the rasterized data generating unit 203, and forms an image based on the obtained rasterized data (Step S411).

Meanwhile, the pull-print data supplying unit 204 of the second MFP 20B obtains the rasterized data depending on the resolution (600 dpi) of the second MFP 20B from the rasterized data generating unit 203. The pull-print data supplying unit 204 supplies the rasterized data depending on the resolution (600 dpi) of the second MFP 20B and the resolution information (600 dpi) of the second MFP 20B in relation with each other to the server device 30 via the network N (Step S412).

The server device 30 obtains the rasterized data depending on the resolution (600 dpi) of the second MFP 20B and the resolution information (600 dpi) from the second MFP 20B via the network N (Step S309). The server device 30 stores the obtained rasterized data depending on the resolution (600 dpi) of the second MFP 20B and the obtained resolution information (600 dpi) in relation with the intermediate data of the particular content, which is already stored in the server device 30 (Step S310). As a result, the server device 30 stores the rasterized data depending on the resolution (1200 dpi) of the first MFP 20A and the resolution information (1200 dpi), and the rasterized data depending on the resolution (600 dpi) of the second MFP 20B and the resolution information (600 dpi), in relation with the intermediate data of the particular content.

2. Second Embodiment

Hereinafter, the configurations, operations, and the like described above will be denoted by the similar reference symbols, description thereof will be omitted, and different points will be mainly described.

In the first embodiment, the pull-print data obtaining unit 206 of the second MFP 20B determines if the resolution information of the rasterized data, which is stored in the server device 30, is the same as the resolution information of the second MFP 20B or not (Step S404). To the contrary, in a second embodiment, the server device 30 determines if the resolution information is the same or not.

Figure 8:
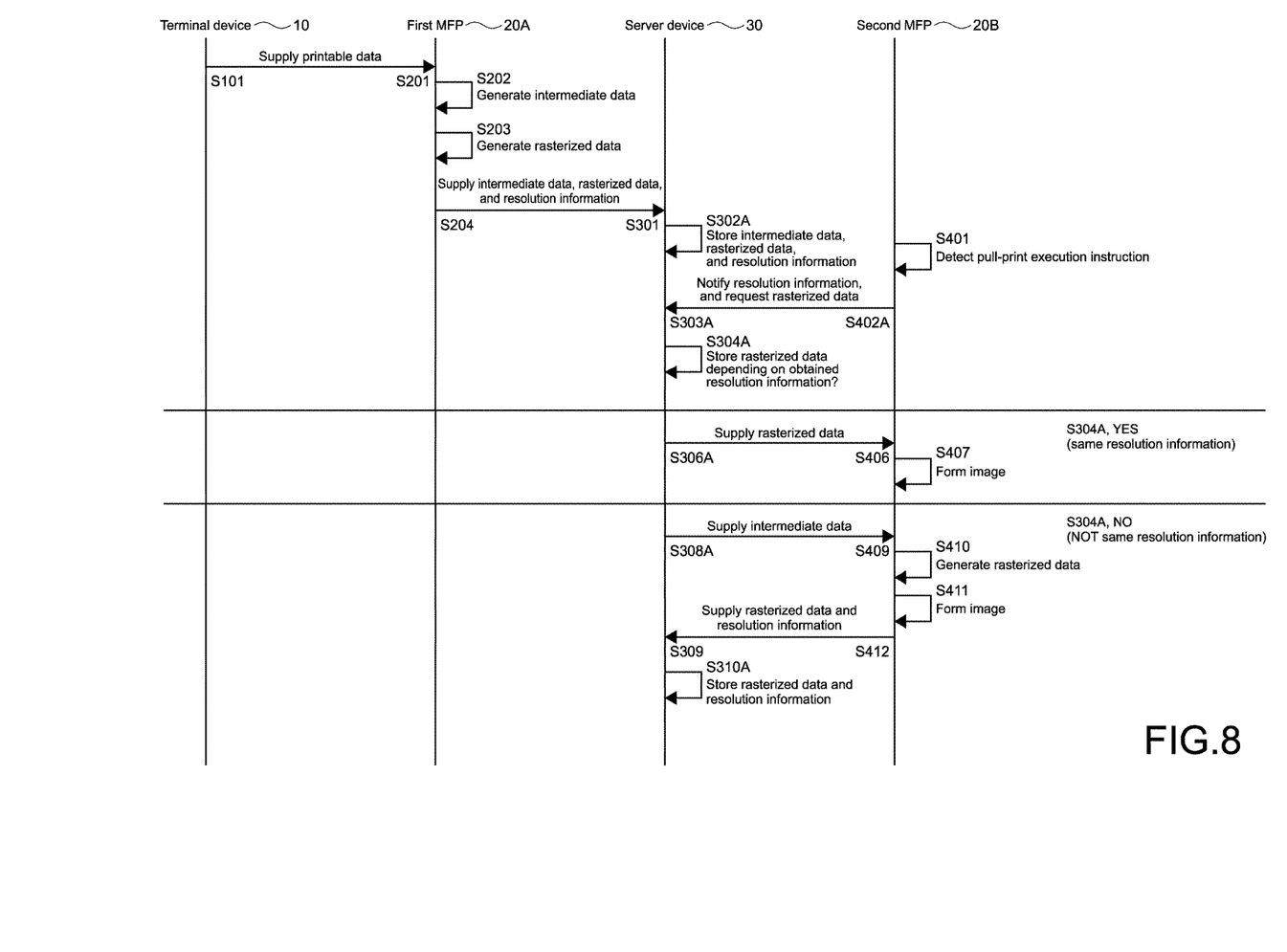
FIG. 8 shows an operational sequence of the information processing system according to a second embodiment.
Figure 9:
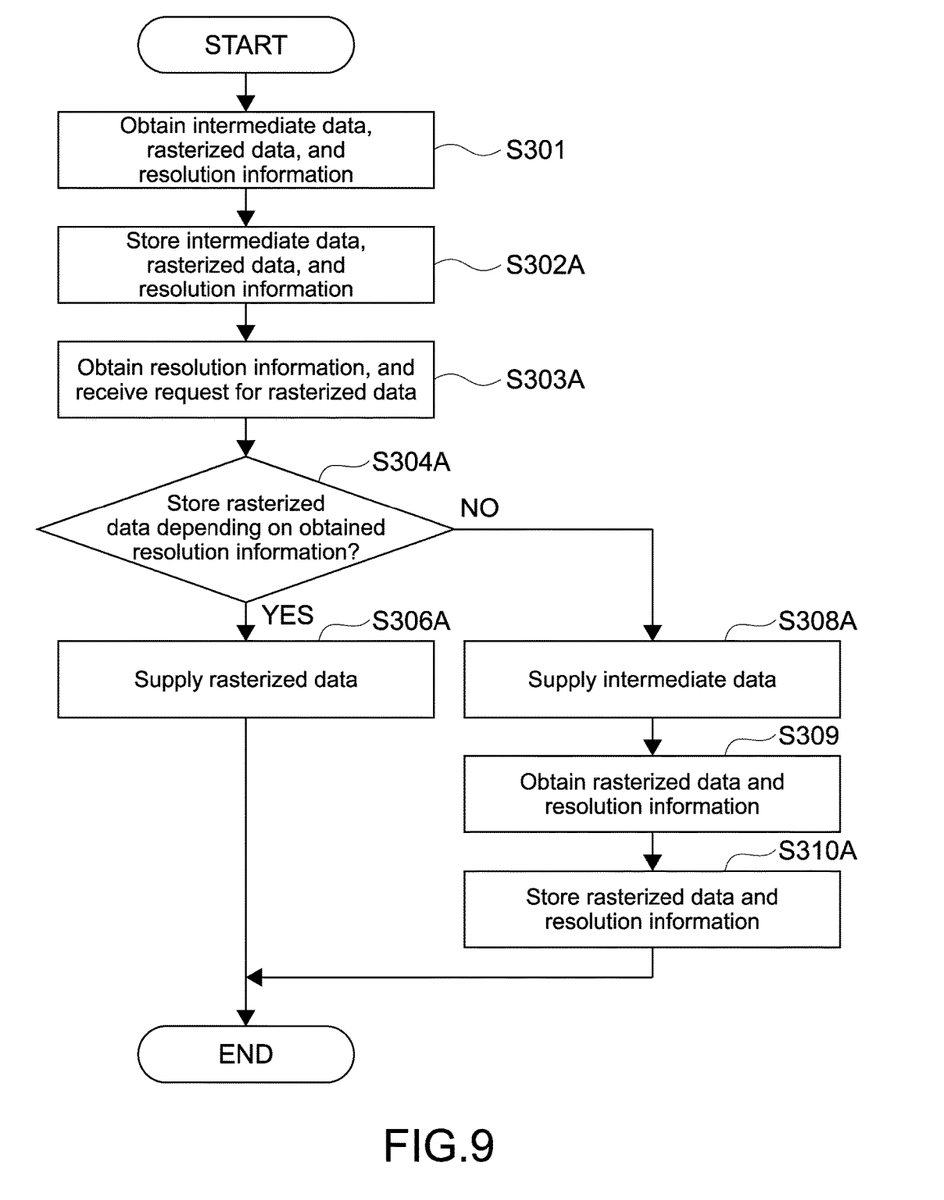
FIG. 9 shows an operational flow of the server device.
Figure 10:
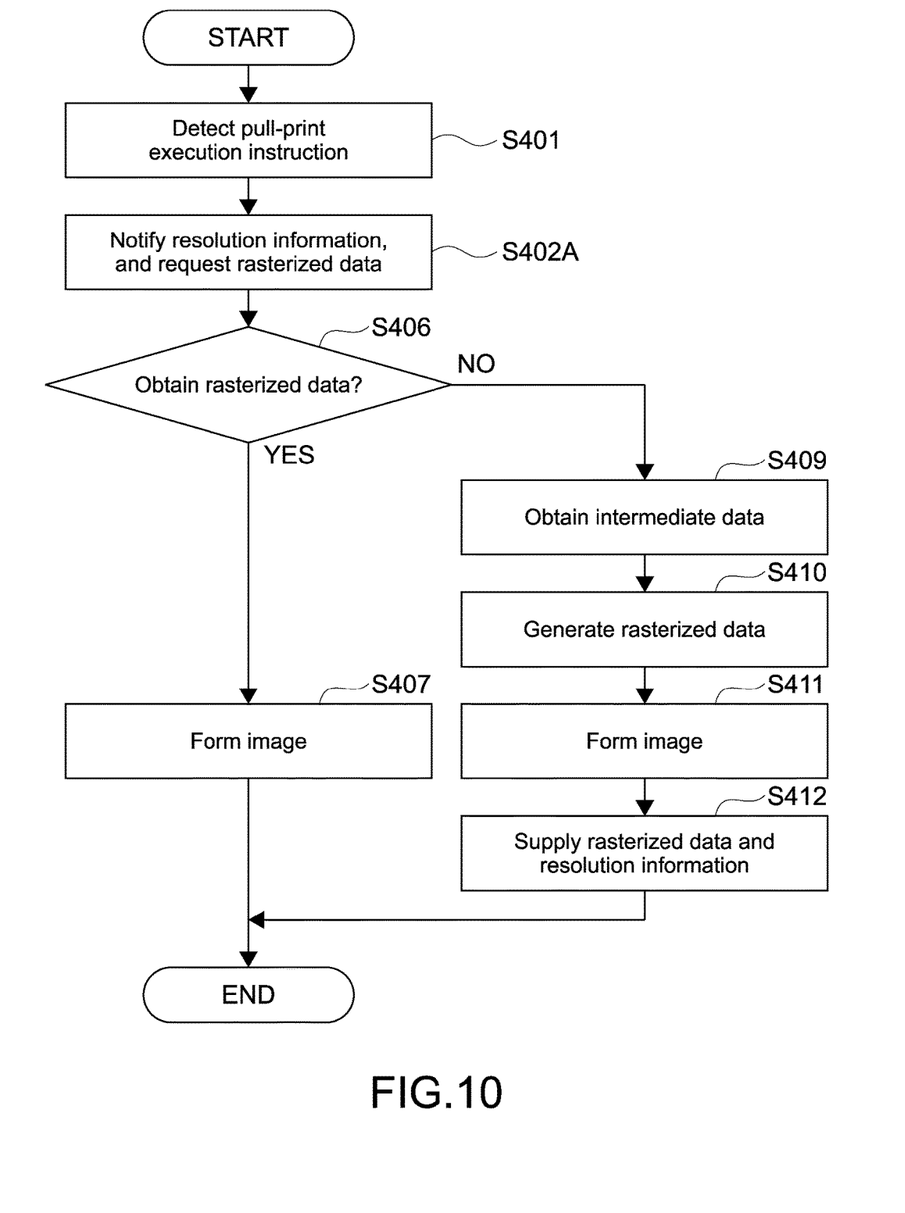
FIG. 10 shows an operational flow of the second image forming apparatus.

FIG. 8 shows an operational sequence of the information processing system according to the second embodiment. FIG. 9 shows an operational flow of the server device. FIG. 10 shows an operational flow of the second image forming apparatus.

The operation of the terminal device 10 in Step S101, the operation of the first MFP 20A in Steps S201 to S204, the operation of the server device 30 in Steps S301 and S302, and the operation of the second MFP 20B in Step S401 are the same as those of the first embodiment.

The pull-print data obtaining unit 206 of the second MFP 20B receives the notification of the pull-print execution instruction (Step S401). Then the pull-print data obtaining unit 206 of the second MFP 20B notifies the resolution information of the second MFP 20B of the server device 30 via the network N, and requests the rasterized data of the particular content depending on the resolution corresponding to the notified resolution information if the server device 30 stores it (Step S402A).

The server device 30 obtains the resolution information of the second MFP 20B and receives the request from the second MFP 20B via the network N (Step S303A). The server device 30 determines if rasterized data of the particular content depending on the resolution of the second MFP 20B is stored or not (Step S304A).

In the present example, the server device 30 obtains (Step S301) the rasterized data depending on the resolution (1200 dpi) from the first MFP 20A, and stores (Step S302) the rasterized data.

Therefore, for example, the server device 30 determines that the resolution information (1200 dpi) of the rasterized data stored in the server device 30 is the same as the resolution information (1200 dpi) of the second MFP 20B, where the server device 30 obtains the resolution information (1200 dpi) from the second MFP 20B (Step S304A, YES). Alternatively, for example, the server device 30 determines that the resolution information (1200 dpi) of the rasterized data stored in the server device 30 is NOT the same as the resolution information (600 dpi) of the second MFP 20B, where the server device 30 obtains the resolution information (600 dpi) from the second MFP 20B (Step S304A, NO).

First, the server device 30 determines that the resolution information (1200 dpi) of the rasterized data stored in the server device 30 is the same as the resolution information (1200 dpi) of the second MFP 20B (Step S304A, YES). In this case, the server device 30 supplies the rasterized data of the particular content depending on the resolution of the second MFP 20B, which is stored in the server device 30, to the second MFP 20B via the network N (Step S306A). The operation of the second MFP 20B in Steps S406 and S407 after that is the same as that of the first embodiment.

On the other hand, the server device 30 determines that the resolution information (1200 dpi) of the rasterized data stored in the server device 30 is NOT the same as the resolution information (for example, 600 dpi) of the second MFP 20B (Step S304A, NO). In this case, the server device 30 supplies the intermediate data of the particular content, which is stored in the server device 30, to the second MFP 20B via the network N (Step S308A). The operation of the second MFP 20B in Steps S409 to S411 and the operation of the server device 30 in Step S309 and S310 after that are the same as those of the first embodiment.

3. Conclusion

According to a typical pull-print technique, when pull-printing an image, an image forming apparatus obtains intermediate data from a server device, generates rasterized data based on the obtained intermediate data, and forms an image based on the generated rasterized data.

For example, according to one possible technique, an MFP prints an image based on original data independent of a resolution according to conditions. In this case, however, the MFP has to generate data (rasterized data) depending on its resolution every time the MFP prints an image. Since it takes time to generate rasterized data, as a result, it takes time to form an image.

To the contrary, according to the above-mentioned embodiments, the server device 30 stores rasterized data generated by the first MFP 20A. As a result, another MFP (the second MFP 20B), whose resolution is the same as the resolution of the first MFP 20A, can obtain the rasterized data from the server device 30 and forming (pull-printing) an image based on the obtained rasterized data. Therefore the second MFP 20B can form the image in a short time, since the time to generate rasterized data for pull-printing is not necessary.

Further, according to the above-mentioned embodiments, the server device 30 also stores intermediate data generated by the first MFP 20A. As a result, another MFP (the second MFP 20B), whose resolution is different from the resolution of the first MFP 20A, can obtain the intermediate data from the server device 30, generating rasterized data, and forming (pull-printing) an image based on the generated rasterized data. At this time, the second MFP 20B supplies the generated rasterized data to the server device 30 to store the rasterized data. As a result, the server device 30 stores not only the rasterized data depending on the resolution of the first MFP 20A and the resolution information, but also the rasterized data depending on the resolution of the second MFP 20B and the resolution information, in relation with the intermediate data of the particular content. In other words, the second MFP 20B, which pull-prints an image, supplies the rasterized data, which is generated in order that the second MFP 20B itself may form the image, to the server device 30 to store the rasterized data in order that not only the second MFP 20B itself but also another MFP may use the rasterized data to form the image. As a result, another MFP, whose resolution is the same as the resolution of the second MFP 20B, can then obtain the rasterized data from the server device 30 and forming (pull-printing) an image. Therefore the other MFP, whose resolution is the same as the resolution of the second MFP 20B, can form the image in a short time, since the time to generate rasterized data for pull-printing is not necessary.

Further, according to another possible technique, a server obtains model information (production number) of an image forming apparatus, generates image data depending on the resolution based on the model information, and supplies the image data to the image forming apparatus. According to this technique, however, since the server manages model information and resolutions in relation with each other, the server has to always update model information every time new models are released.

To the contrary, according to the above-mentioned embodiments, the server device 30 stores intermediate data, rasterized data, and resolution information in relation with each other. Therefore, the second MFP 20B can appropriately obtain rasterized data depending on the resolution of the second MFP 20B itself even without storing model information in the server device 30.

The second MFP 20B (the first embodiment) or the server device 30 (the second embodiment) determines if the resolution information of the rasterized data stored in the server device 30 is the same as the resolution information of the second MFP 20B or not. According to the first embodiment, since the second MFP 20B determines the resolution information, the possibility that the server device 30 determines the resolution information of a plurality of second MFPs at the same time is avoided. Meanwhile, according to the second embodiment, since the information processing capacity of the server device 30 is typically higher than those of MFPs, the server device 30 can determine the resolution information at high speed.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus, comprising:
a pull-print execution instruction detecting circuit that detects an operation input by a user as a pull-print execution instruction;
a pull-print data obtaining circuit that, in response to the pull-print execution instruction, obtains rasterized data depending on a resolution of the image forming apparatus from a server device, the server device storing intermediate data and one or more pieces of rasterized data, the intermediate data being generated based on printable data described in a page description language and independent of a resolution, the one or more pieces of rasterized data being generated based on the intermediate data and depending on one or more resolutions, respectively;
an image forming circuit that forms an image based on the obtained rasterized data; and
a rasterized data generating circuit that generates the rasterized data depending on the resolution of the image forming apparatus based on the intermediate data, wherein where the server device fails to store the rasterized data depending on the resolution of the image forming apparatus, the rasterized data being to be obtained by the pull-print data obtaining circuit in response to the pull-print execution instruction, the pull-print data obtaining circuit obtains the intermediate data from the server device, the rasterized data generating circuit that generates the rasterized data depending on the resolution of the image forming apparatus based on the obtained intermediate data, and the image forming circuit forms an image based on the generated rasterized data.

2. The image forming apparatus according to claim 1, further comprising:

a pull-print data supplying circuit that supplies, to the server device, the generated rasterized data in relation with the resolution of the image forming apparatus.

3. The image forming apparatus according to claim 1, wherein the pull-print data obtaining circuit determines, in response to the pull-print execution instruction, if the server device stores the rasterized data depending on the resolution of the image forming apparatus or not, obtains the rasterized data from the server device, where it is determined that the server device stores the rasterized data, and obtains the intermediate data from the server device, where it is determined that the server device fails to store the rasterized data.

4. The image forming apparatus according to claim 1, further comprising:

a printable data obtaining circuit that obtains, from a terminal device, the printable data depending on the resolution of the image forming apparatus; and an intermediate data generating circuit that, where the printable data obtaining circuit obtains the printable data, generates the intermediate data based on the obtained printable data, wherein the rasterized data generating circuit generates the rasterized data depending on the resolution of the image forming apparatus based on the generated intermediate data, and the pull-print data supplying circuit supplies, to the server device, the generated rasterized data and the generated intermediate data in relation with the resolution of the image forming apparatus.

5. A non-transitory computer readable recording medium that records a program executable by a computer, the program causing the computer of an image forming apparatus to operate as:

a pull-print execution instruction detecting circuit that detects an operation input by a user as a pull-print execution instruction;

a pull-print data obtaining circuit that, in response to the pull-print execution instruction, obtains rasterized data depending on a resolution of the image forming apparatus from a server device, the server device storing intermediate data and one or more pieces of rasterized data, the intermediate data being generated based on printable data described in a page description language and independent of a resolution, the one or more pieces of rasterized data being generated based on the intermediate data and depending on one or more resolutions, respectively;

an image forming circuit that forms an image based on the obtained rasterized data; and a rasterized data generating circuit that generates the rasterized data depending on the resolution of the image forming apparatus based on the intermediate data, wherein where the server device fails to store the rasterized data depending on the resolution of the image forming apparatus, the rasterized data being to be obtained by the pull-print data obtaining circuit in response to the pull-print execution instruction, the pull-print data obtaining circuit obtains the intermediate data from the server device, the rasterized data generating circuit that generates the rasterized data depending on the resolution of the image forming apparatus based on the obtained intermediate data, and the image forming circuit forms an image based on the generated rasterized data.

6. An information processing system, comprising:

a server device storing intermediate data and one or more pieces of rasterized data, the intermediate data being generated based on printable data described in a page description language and independent of a resolution, the one or more pieces of rasterized data being generated based on the intermediate data and depending on one or more resolutions, respectively; and an image forming apparatus capable of communicating with the server device, the image forming apparatus including a pull-print execution instruction detecting circuit that detects an operation input by a user as a pull-print execution instruction, a pull-print data obtaining circuit that, in response to the pull-print execution instruction, obtains rasterized data depending on a resolution of the image forming apparatus from the server device, an image forming circuit that forms an image based on the obtained rasterized data, and a rasterized data generating circuit that generates the rasterized data depending on the resolution of the image forming apparatus based on the intermediate data, wherein where the server device fails to store the rasterized data depending on the resolution of the image forming apparatus, the rasterized data being to be obtained by the pull-print data obtaining circuit in response to the pull-print execution instruction, the server device provides the intermediate data to the image forming apparatus, the pull-print data obtaining circuit obtains the intermediate data from the server device, the rasterized data generating circuit that generates the rasterized data depending on the resolution of the image forming apparatus based on the obtained intermediate data, and the image forming circuit forms an image based on the generated rasterized data.

7. The information processing system according to claim 6, wherein the image forming apparatus further includes a pull-print data supplying circuit that supplies, to the server device, the generated rasterized data in relation with the resolution of the image forming apparatus, and the server device stores the supplied rasterized data in relation with the intermediate data supplied to the image forming apparatus.

\* \* \* \* \*